United States Patent [19]

Horrocks

[11] 4,315,151

[45] Feb. 9, 1982

[54] DETECTING PHASE SEPARATION IN LIQUID SCINTILLATION SAMPLES

[75] Inventor: Donald L. Horrocks, Placentia, Calif.

[73] Assignee: Beckman Instruments, Inc., Fullerton, Calif.

[21] Appl. No.: 166,520

[22] Filed: Jul. 7, 1980

[51] Int. Cl.³ .............................................. G01T 1/20
[52] U.S. Cl. .................................... 250/362; 250/364
[58] Field of Search ............... 250/302, 304, 306, 328, 250/362, 364

[56] References Cited

U.S. PATENT DOCUMENTS

| | | | |
|---|---|---|---|
| 3,715,584 | 2/1973 | Rosenstingl | 250/362 |
| 3,780,289 | 12/1973 | Kulberg et al. | 250/362 |
| 3,883,738 | 5/1975 | Glover et al. | 250/304 |
| 4,075,480 | 2/1978 | Horrocks | 250/328 |
| 4,158,135 | 6/1979 | Thorell | 250/364 |

Primary Examiner—Alfred E. Smith
Assistant Examiner—Janice A. Howell
Attorney, Agent, or Firm—R. J. Steinmeyer; Robert R. Meads; Robert J. Stern

[57] ABSTRACT

Method for testing a liquid scintillation sample to determine whether it is separated into different phases. Scintillations emitted by the sample in response to radiation from an external radiation source are analyzed. If the distribution of the intensities of the scintillations has a characteristic indicating it is the superposition of the intensity distributions of scintillations emitted by two or more distinct phases, then the sample is adjudged to be separated into different phases.

8 Claims, 7 Drawing Figures

DETECTING PHASE SEPARATION IN LIQUID SCINTILLATION SAMPLES

BACKGROUND OF THE INVENTION

1. Field of the Invention

The present invention relates generally to liquid scintillation counters for analyzing the radioactive emissions of a liquid scintillation sample. More particularly, the invention relates to means for detecting when the sample is separated into different phases.

2. Description of the Prior Art

Liquid scintillation counters (L.S. counters) are instruments widely used for measuring the number and energy levels of radioactive particles emitted by a solid or liquid radioactive substance. In operation, the radioactive substance is mixed with an organic scintillation solution, and the resulting mixture constitutes the liquid scintillation sample analyzed by the instrument. The organic scintillation solution is designed to emit a burst of light called a scintillation in response to each radioactive emission from the radioactive substance. The L.S. counter measures the intensity of each scintillation to determine the energy of the radioactive emission that caused the scintillation, and it counts the number of scintillations to determine the number of radioactive emissions.

It is well known that every liquid scintillation sample suffers a quenching phenomenon whereby the intensity, and in many cases the number, of scintillations produced in respone to radioactive emissions are reduced according to the amount of quench in the sample. The amount of quench varies considerably from one sample to another, depending on the particular composition of each sample. An L.S. counter usually includes a quench compensation system which determines the amount of quench in each sample and corrects the scintillation measurements in accordance therewith.

To obtain accurate results, every quench compensation system known to this applicant requires each sample to be uniformly mixed and to remain so during the time the sample is analyzed by the L.S. counter However, in many cases in which the radioactive substance is aqueous, its mixture with the organic scintillation solution wil not remain stable, and gravity will cause the sample mixture to slowly separate into two or more stratified phases. Such separation generally upsets the accuracy of the quench compensation system because the different phases exhibit different amounts of quench and may contain different concentrations of the radioactive substance.

The foregoing separation problem commonly arises when hundreds of samples are mixed in advance for automatic analysis by an L.S. counter. Such analysis may occupy hours or days. Upon completion of the analysis, many samples may be visually observed to have separated into different phases, but it may be uncertain whether the separation occurred before or after the samples were analyzed, and thus uncertain whether the analysis was erroneous and must be repeated. To ensure accuracy, it is therefore necessary to repeat the analysis of all separated samples, even though many may already have been analyzed correctly because they had not separated until after their analysis.

The separation problem is potentially even more harmful when the samples are contained in opaque vials such as the white plastic vials presently in common use. The opaqueness of the vials prevents visual examination of the samples, hence the separation of any samples into phases will usually escape detection, and erroneous analytical results may be accepted as valid.

SUMMARY OF THE INVENTION

The present invention is a method and apparatus for testing a liquid scintillation sample to determine whether it is separated into different phases. The determination is made by analyzing the intensities of the scintillations emitted by the sample in respone to radiation from an external radiation source.

A liquid scintillation counter incorporating the present invention can perform the test on each sample at the same time that other analyses are performed on that sample. If the test indicates that a sample has separated into different phases, the analyses of that sample can be either aborted or accompanied by a message warning that the results are probably inaccurate. Conversely, if the test indicates that a sample has not separated, the analytical results for that sample can be trusted even if the sample subsequently separates. Thus, the present invention eliminates the uncertainty which arose heretofore whenever a sample left for analysis was subsequently discovered to have separated into phases. In addition, the present invention eliminates any need to visually inspect samples to detect separation.

DESCRIPTION OF THE PREFERRED EMBODIMENTS

Before describing the present invention, the fundamental characteristics of a liquid scintillation system will be reviewed.

A liquid scintillation system typically is designed to detect ionizing particles emitted by a radioactive substance. Examples of ionizing particles are alpha particles, beta particles, Compton-scattered electrons, and conversion electrons. Liquid scintillation systems require the radioactive substance to be mixed with an organic liquid scintillation solution, the function of the solution being to absorb the energy of each ionizing particle and convert part of this energy to a burst of light, called a scintillation, whose intensity is determined by the energy of the particle. The mixture containing the radioactive substance and the organic liquid scintillation solution is called the liquid scintillation sample.

A liquid scintillation sytem also includes an instrument called a liquid scintillation counter (L.S. counter) which measures the intensity of each scintillation to determine the energy of its corresponding ionizing particle and which counts the number of scintillations (and hence ionizing particles) that fall within one or more predetermined ranges of intensity.

A typical liquid scintillation system can also detect ionizing particles produced within the liquid scintillation sample in response to radioactive emissions, such as gamma rays, from a radiation source either internal or external to the sample. For example, if a gamma ray has an energy level between 0.1 and 3.0 MeV, it will transfer energy to the liquid scintillation sample primarily by a process known as Compton scattering whereby the gamma ray collides with an electron within the sample and transfers part of its energy to the electron as kinetic energy. The Compton-scattered electron then transfers its energy to the liquid scintillation solution, thereby producing a scintillation whose intensity is determined by the energy transferred by the gamma ray to the Compton-scattered electron.

Figure 1:
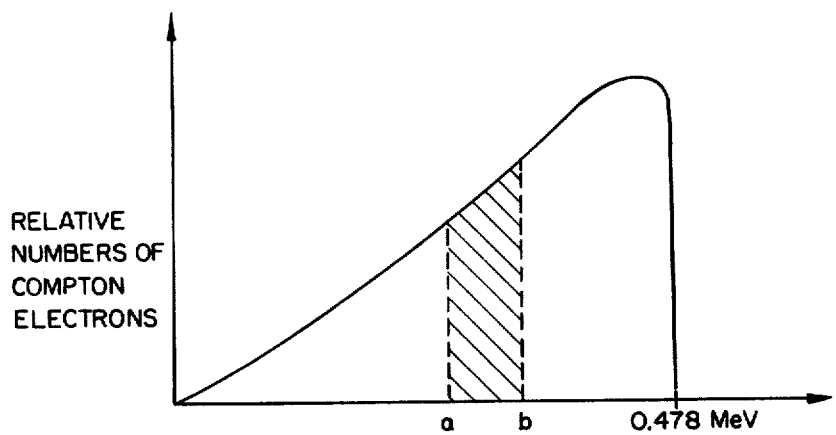
FIG. 1 is a graph showing the statistical distribution of the energy levels of Compton-scattered electrons produced by 0.662 MeV gamma rays emitted by a Cesium-137 radiation source.

The amount of energy transferred from a gamma ray to a Compton-scattered electron varies statistically in a range between zero and a certain maximum value determined by the energy of the gamma ray. FIG. 1 shows the statistical distribution of the energy levels of Compton-scattered electrons produced by mono-energetic gamma rays from an external radiation source. In particular, FIG. 1 was obtained using a Cesium-137 radiation source which emits 0.662 MeV gamma rays.

The horizontal axis of FIG. 1 repreents the energy of the Compton-scattered electrons, and the vertical axis represents the relative number of electrons having a given energy. In FIG. 1 as well as all subsequent figures, the vertical axis is plotted on a linear scale and the horizontal axis is plotted on a logarithmic scale.

The energy distribution curve in FIG. 1 is drawn so that the number of electrons having energies between two energy values equals the area under the curve between the two energy values. For example, the number of electrons having energies between the values designated "a" and "b" in FIG. 1 equals the shaded area in the figure.

Of particular significance in FIG. 1 is the sharp drop off in the relative numbers of Compton-scattered electrons having energies above the 0.478 MeV maximum energy level. This sharp drop off in the energy distribution curve is known as the "Compton edge."

Figure 2:
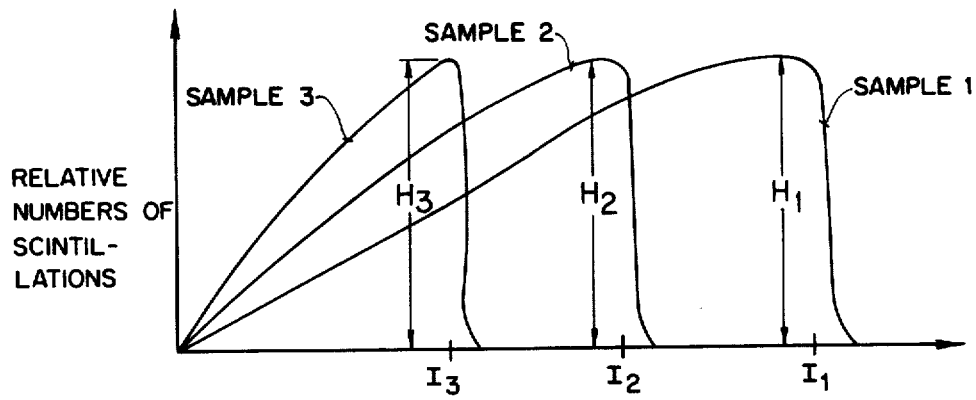
FIG. 2 is a graph showing, for three samples having different amounts of quench, the distribution of intensities of the scintillations produced by irradiating the respective samples with 0.662 MeV gamma rays.

If the sample exhibited zero quench, the distribution of intensities of the scintillations produced by a sample irradiated with 0.662 MeV gamma rays would look just like the distribution of Compton-scattered electron energy levels shown in FIG. 1. However, in samples exhibiting quench, the scintillation intensity distribution curve is shifted to the left and changed somewhat in shape. FIG. 2 shows, for three samples of equal volume having different amounts of quench, the distribution of intensities of the scintillations produced by irradiating the respective samples with 0.662 MeV gamma rays from a Cesium137 radiation source.

An important characteristic of the three curves in FIG. 2 is that each of them has a Compton edge, i.e., a sharp drop off above a certain upper intensity level $I_1$, $I_2$ or $I_3$. With increasing amounts of quench, the upper intensity level at which the Compton edge appears shifts to successively lower intensity levels. In particular, the upper intensity level $I_3$ for highly quenched "Sample 3" is much lower than the upper intensity level $I_1$ for slightly quenched "Sample 1." "Sample 2" has an intermediate amount of quench and an intermediate upper intensity level. In fact, the amount of downward shift in the Compton edge or upper intensity level may be measured to determine the degree of quench. This conept is described at length in this applicant's U.s. Pat. No. 4,075,480, assigned to the same assignee as the present application.

Another characteristic of the three curves in FIG. 2 is that each has a Compton edge of approximately the same height. The height of a Compton edge is defined as the magnitude of the sharp drop off in the intensity distribution curve at the Compton edge. In FIG. 2, the intensity distribution curves for Samples 1, 2 and 3 are respectively shown as exhibiting Compton edges having approximately equal heights of $H_1$, $H_2$ and $H_3$.

The foregoing description implicitly assumed that each liquid scintillation sample was uniformly mixed so as to exhibit a uniform degree of quench. As discussed in the "Background of the Invention," some samples separate into different stratified phases, each phase exhibiting a different amount of quench. In such a sample, each phase emits scintillations having a distribution of intensities whose characteristics, including the upper intensity level, are determined by the amount of quench exhibited by that phase. An L.S. counter responds to the scintillations emitted by all the phases of the sample, so that the scintillation intensity distribution curve of the scintillations detected by the L.S. counter is the summation or superposition of the disribution curves for each phase.

Consider a hypothetical liquid scintillation sample separated into two phases having different amounts of quench. More particularly, suppose Phase 1 and Phase 2 of the separated sample have the same amounts of quench as Sample 1 and Sample 2, respectively, from the discussion of FIG. 2. Also, suppose the separated sample is irradiated by 0.662 MeV gamma rays as were Samples 1 and 2 in the previous discussion.

If the emitted scintillations could be measured individually for each of the two phases, the scintillation intensity distribution curves for Phase 1 and Phase 2 would be identical to the curves shown in FIG. 2 for Sample 1 and Sample 2, respectively. However, a conventional L.S. counter has no means for distinguishing between the scintillations emitted by the two phases, and it will analyze the separated sample based on all the scintillations emitted by both phases. The resulting scintillation intensity distribution curve for the separated sample, shown in FIG. 3, is a weighted summation or superposition of the respective curves for the two phases.

More specifically, the curves for the two phases are weighted according to the relative volumes of the two phases. The curves are weighted this way because the Compton-scattered electrons produced in response to the external gamma radiation source are distributed uniformly throughout the sample volume, and hence the number of Compton-scattered electrons produced within each phase is proportional to the volume of that phase.

Figure 3:
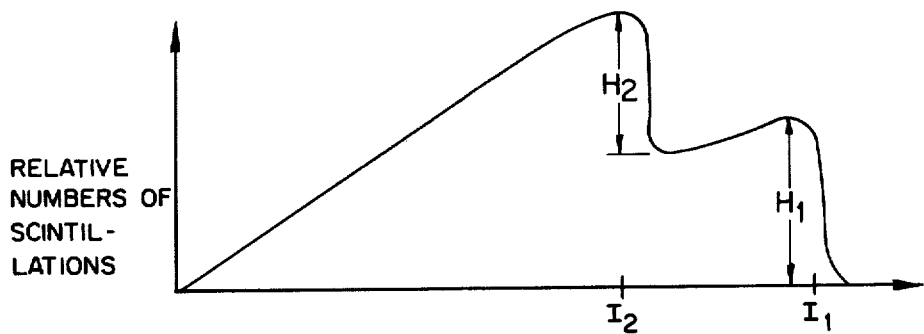
FIG. 3 is a graph showing, for a sample which is separated into two different phases, the scintillation intensity distribution obtained under the same conditions as in FIG. 2. Each phase has approximately equal volume.

The Phase 1 curve and the Phase 2 curve were weighted equally in constructing the summation curve shown in FIG. 3. Therefore, FIG. 3 represents the intensity distribution curve for a sample separated into two phases of equal volume.

Figure 4:
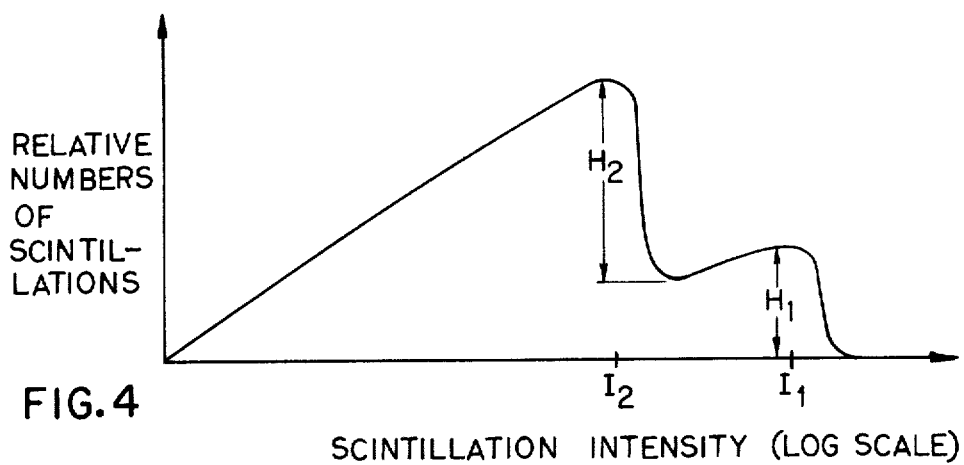
FIG. 4 is a graph like that of FIG. 3 except that the volume of the less-quenched phase is less than that of the more-quenched phase.
Figure 5:
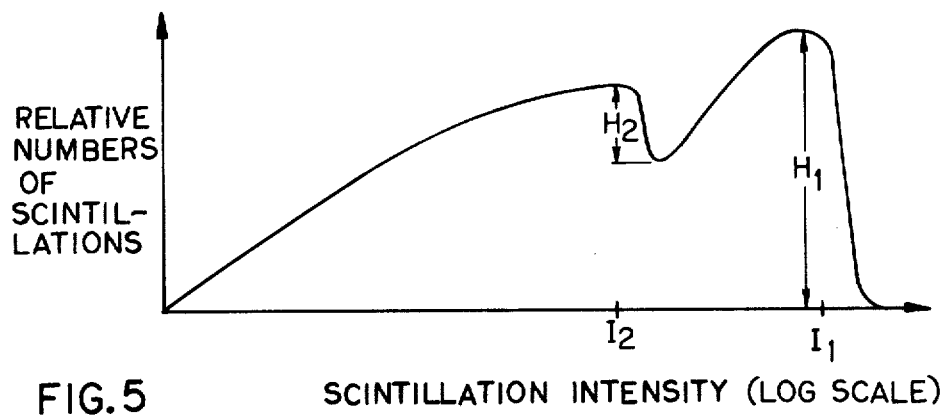
FIG. 5 is a graph like that of FIG. 3 except that the volume of the less-quenched phase is greater than that of the more-quenched phase.

FIGS. 4 and 5 each show the intensity distribution curve for a sample separated into two phases having the same characteristics as the two phases of the sample represented in FIG. 3. However, in FIG. 4 the volume of less-quenched Phase 1 is less than that of more-quenched Phase 2, and in FIG. 5 the volume of less-quenched Phase 1 is greater than that of more-quenched Phase 2.

It is apparent from FIGS. 3–5 that one index of the relative volumes of the two phases is the relative heights $H_1$ and $H_2$ of their respective Compton edges. Specifically, the height of the Compton edge is volume-weighted along with the other features of the distribution curve, and therefore the ratio of height $H_1$ to height $H_2$ equals the ratio of the volume of Phase 1 to the volume of Phase 2.

Although FIGS. 3–5 represent a two-phase sample, the same relationships apply to a sample separated into three or more phases. That is, the sample's scintillation intensity distribution curve includes a Compton edge associated with each phase whose height is proportional to the volume of that phase.

The method according to the present invention of determining whether a sample is separated into different phases is based on characteristics which distinguish a scintillation intensity distribution curve for a separated sample, such as the curves in FIGS. 3–5, from a distribution curve for a uniform sample, such as the curves in FIG. 2.

One characteristic distinguishing the curves of FIGS. 3–5 from those of FIG. 2 relates to the Compton edge, i.e., the intensity level above which the number of scintillations abruptly drops off. Each curve in FIG. 2 has a single Compton edge, whereas each curve in FIGS. 3–5 has two Compton edges. Because each of them is a weighted superposition of the Sample 1 and Sample 2 curves in FIG. 2, the curves in FIGS. 3–5 have Compton edges at both of the intensity levels $I_1$ and $I_2$ at which the Compton edges occur in the Sample 1 and Sample 2 curves, respectively.

The above example can be generalized as follows. Suppose a liquid scintillation sample is irradiated with mono-energetic gamma rays, thereby causing the sample to emit scintillations which can be characterized by an intensity distribution curve. If the sample is uniformly mixed so as to exhibit uniform quenching, then the scintillation intensity distribution curve will include exactly one Compton edge. If the sample is separated into phases exhibiting different amounts of quench, then the curve will include as many Compton edges as there are differently quenched phases. Therefore, one method of detecting whether a sample is separated into different phases is to irradiate it as described above and analyze the distribution of scintillation intensities to detect the presence of more than one Compton edge.

In addition to the foregoing method for detecting whether a sample is separated into different phases, the present invention encompasses methods for determining certain characteristics of each phase.

In particular, the present invention encompasses a method for determining the relative volumes of the phases into which a sample is separated. It was stated earlier that the scintillation intensity distribution curve for a sample includes a Compton edge associated with each phase, and that the heights of the Compton edges bear the same relative proportions as the volumes of the corresponding phases. Therefore, a method of determining the relative volumes of the phases is to measure the relative height of the Compton edge associated with each phase.

The present invention also encompasses a method for determining the degree of quench exhibited by each phase into which a sample is separated. The above cited U.S. Pat. No. 4,075,480 discloses that the degree of quench exhibited by a homogenous sample can be determined by measuring the scintillation intensity at which the Compton edge occurs. Furthermore, it was shown earlier that the scintillation intensity distribution curve for a sample separated into different phases has a Compton edge at each of the intensity values at which the different phases would exhibit Compton edges if measured individually. Therefore, a method of determining the degree of quench of each phase is to measure the scintillation intensity at which occurs the Compton edge associated with that phase, and from this determine the degree of quench according to the method disclosed in the cited patent.

The preferred apparatus for performing the above methods comprises a conventional liquid scintillation counter of the type having a multichannel analyzer. This type of L.S. counter obtains a scintillation intensity distribution histogram or curve for a sample by dividing the range of scintillation intensities into several hundred narrow ranges or windows and counting the number of scintillations whose intensities fall within each window.

In operation, the sample is exposed to a mono-energetic gamma radiation source and the L.S. counter measures and stores a scintillation intensity distribution histogram. This histogram represents the scintillations emitted due to both the gamma radiation and any radioactive substance in the sample. Next, the gamma radiation source is removed and a second scintillation intensity distribution histogram is measured and stored. This second histogram represents the scintillations emitted due to the radioactive substance in the sample only. The scintillation counts in the second histogram are then subtracted from the counts in the first histogram to obtain a scintillation intensity distribution histogram representing only the scintillations emitted due to the gamma radiation source.

This last mentioned histogram is then analyzed according to the method disclosed in the earlier cited U.S. Pat. No. 4,075,480 to locate each Compton edge characteristic appearing in the histogram. In short, a Compton edge may be identified by an interval in the distribution histogram or curve in which the slope has a large value. As disclosed in the cited patent, the intensity value at which the Compton edge occurs may be approximated by the intensity value at which the distribution histogram or curve has a second derivative equal to zero.

As explained earlier, the presence of two or more Compton edges indicates that the sample has separated into two or more phases. As also explained earlier, the degree of quench exhibited by each phase may be determined from the intensity value at which the associated Compton edge occurs. Also, the relative volumes of the phases can be determined from the relative heights of the Compton edges.

The present invention further encompasses other methods of determining whether a sample is separated into different phases. The foregoing method used the presence of more than one Compton edge to distinguish the intensity distribution curve of a separated sample (as shown in FIGS. 3–5) from that of a homogenous sample (as shown in FIG. 2). However, there are other characteristics distinguishing these two types of distribution curves.

Figure 6:
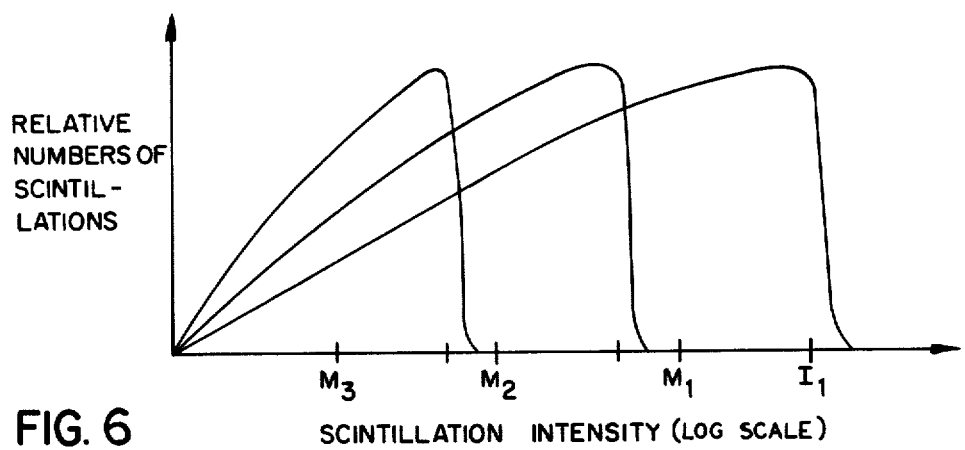
FIG. 6 is a graph showing the same three curves as FIG. 2, and also showing the mean scintillation intensity for each of the three samples.
Figure 7:
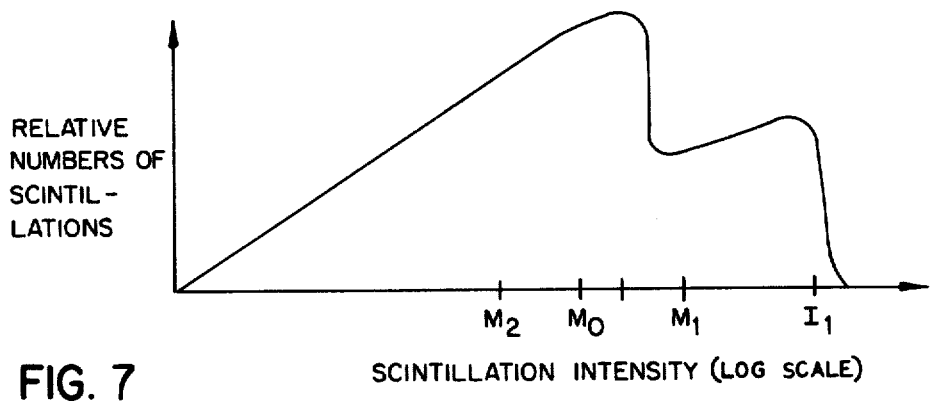
FIG. 7 is a graph showing the same curve as FIG. 3, and also showing the mean scintillation intensity for the separated sample, for Phase 1 alone, and for Phase 2 alone.

One such characteristic relates to the mean value of the scintillation intensity. FIGS. 6 and 7 show the same scintillation intensity distribution curves as FIGS. 2 and 3, respectively, with the mean scintillation intensity of each curve marked on the horizontal axis of each graph. In FIG. 6, the mean intensity of the scintillations from Samples 1, 2 and 3 are indicated by the symbols $M_1$, $M_2$ and $M_3$, respectively. In FIG. 7, $M_0$, $M_1$ and $M_2$ indicate the mean scintillation intensity for the entire separated sample, for Phase 1 alone, and for Phase 2 alone, respectively.

It was explained earlier that the scintillation intensity distribution curve for the separated sample is a weighted summation or superposition of the distribution curves for the two phases of the sample. This implies that the mean scintillation intensity $M_0$ for the separated sample is a weighted average of the mean scintillation intensities $M_1$ and $M_2$, respectively, for the two phases, and hence $M_0$ is less than $M_1$. In other words, the mean scintillation intensity of a separated sample is less than the mean scintillation intensity of the sample's least-quenched phase. On the other hand, if a sample is uniform and not separated into different phases, the sample's least-quenched phase in effect consists of the entire sample. Thus, the mean scintillatin intensity of a uniform sample equals the mean scintillation intensity of the sample's least-quenched phase. Therefore, one method of detecting whether a sample is separated is to determine whether the mean scintillation intensity of the sample is less than that of the sample's least-quenched phase.

Although the mean scintillation intensity can be measured directly for a sample, it cannot be measured directly for the sample's least-quenched phase because the scintillations emitted by one phase cannot be distinguished from those emitted by the other phases of the sample. However, the mean scintillation intensity of the least-quenched phase can be estimated by the following method.

The method is based on the fact that the intensity distribution in general, and the mean intensity in particular, of the scintillations emitted in response to a known gamma radiation source by either a uniform sample or a single phase of a separated sample is a function solely of the amount of quench in the sample. The latter, in turn, is a function solely of the Compton edge upper intensity level of the scintillations. Therefore, the mean intensity of the scintillations is a function solely of the Compton edge upper intensity level.

The function relating the mean scintillation intensity to the Compton edge upper intensity level may be determined empirically by simple measuring the mean intensity and the upper energy level of each of several homogeneous (i.e., single phase) calibration samples. The calibration samples should have different amounts of quench spanning a range from zero quench to very large quench. These measurements give the value of the function at each of several calibration points, from which the values at intermediate points can be estimated by methods such as linear interpolation or a best fit equation.

Combining the foregoing principles, the preferred method of determining whether a liquid scintillation sample is separated into different phases is as follows:

Before analyzing an actual test sample, a set of calibration samples is analyzed as described in the second preceding paragraph in order to derive a function relating the mean intensity to the Compton edge intensity of scintillations from a uniform sample.

After the above calibration step is completed, an actual liquid scintillation sample may be analyzed. The analysis comprises measuring the intensity distribution for the scintillations emitted by the sample in response to a gamma radiation source. The intensity distribution is measured using the method and apparatus described earlier. The mean scintillation intensity and the Compton edge upper intensity level are then determined from the intensity distribution.

The Compton edge upper intensity level measured in the preceding step is the same as the Compton edge of the least-quenched phase of the sample. Using the function derived in the initial calibration step, an estimate of the mean scintillation intensity of the least-quenched phase is computed from the measured Compton edge upper intensity level.

Finally, the measured mean scintillation intensity of the sample is compared with the computed mean scintillation intensity of the least-quenched phase. If the former is significantly less than the latter, then the sample is adjudged to be separated into different phases. Otherwise, the sample is adjudged to be uniform.

If the sample is adjudged to be uniform, the results of any other analyses performed on the sample may be trusted, even if the sample subsequently separates. On the other hand, if the sample is adjudged to be separated into different phases, any other analyses can automatically be either aborted or accompanied by a warning message. In any case, the present invention eliminates any need to visually inspect the sample to detect separation.

Once the initial calibration step is performed, many samples may be analyzed without recalibration. The calibration need be repeated only often enough to correct for gradual drifts in component values due to component aging, temperature changes, and the like.

The standard gamma radiation source used in conjunction with the preferred method need not be monoenergetic; i.e., the gamma rays it emits need not all have the same energy. Since only the uppermost Compton edge is measured, the presence of multiple Compton edges when a poly-energetic gamma radiation source is used will not interfere with the analysis.

What is claimed is:

1. A method of determining whether a liquid scintillation sample is separated into different phases, comprising the steps of:

irradiating the sample with gamma rays from a radiation source to produce energetic electrons in the sample by Compton scattering and thereby cause the sample to emit successive scintillations, each scintillation being caused by a transfer of energy from one of the Compton-scattered electrons and having an intensity corresponding to the amount of energy so transferred;

measuring the relative numbers of scintillations emitted in response to the gamma rays having intensities distributed within each of a plurality of ranges of intensities; and determining from said distribution of intensities whether the sample is separated into different phases.

2. A method according to claim 1, wherein the step of determining whether the sample is separated comprises measuring a characteristic of the distribution of intensities; and determining that the sample is separated into different phases if the characteristic indicates the intensity distribution is the superposition of the intensity distributions of scintillations emitted by two or more distinct phases within the sample.

3. A method according to claim 1 wherein the gamma rays are mono-energetic; and the step of determining whether the sample is separated comprises determining that the sample is separated into different phases if the distribution of intensities has at least two Compton edges.

4. A method according to claim 3, further comprising the steps of:

identifying each Compton edge characteristic in the intensity distribution;

counting the number of Compton edges in the intensity distribution; and determining that each Compton edge corresponds to a distinct phase into which the sample is separated and that the number of phases into which the sample is separated equals said number of Compton edges.

5. A method according to claim 4, further comprising the steps of:

determining the value of a parameter which approximates the value of the intensity at which one of the Compton edges appears in the intensity distribution; and determining from the parameter value the degree of quench characterizing the distinct phase corresponding to said one Compton edge.

6. A method according to claim 4, further comprising the steps of:

measuring the relative height of each Compton edge; and determining that the relative volume of the distinct phase corresponding to each Compton edge is proportional to the relative height of that Compton edge.

7. A method of determining whether a liquid scintillation sample is separated into different phases, comprising the steps of:

irradiating the sample with gamma rays from a radiation source to produce energetic electrons in the sample by Compton scattering and thereby cause the sample to emit successive scintillations, each scintillation being caused by a transfer of energy from one of the Compton-scattered electrons and having an intensity corresponding to the amount of energy so transferred, and substantially all of the scintillations having intensities below an upper intensity level corresponding to a Compton edge, the upper intensity level being indicative of the degree of quench in the sample;

measuring a parameter of the successive scintillations emitted in response to the gamma rays, the paramter being approximately equal to the Compton edge upper intensity level;

measuring the average intensity of the successive scintillations emitted in response to the gamma rays; and determining that the sample is separated into two or more phases if, according to a predetermined comparison criterion, the average intensity is sufficiently less than the measured parameter.

8. A method of determining whether a liquid scintillation sample is separated into different phases, comprising the steps of:

irradiating the sample to cause it to emit successive scintillations having different intensities, substantially all of the scintillations having intensities below an upper intensity level, the upper level being indicative of the degree of quench in the sample;

measuring a parameter of the succession of scintillations emitted in response to the radiation, the parameter being approximately equal to said upper intensity level;

measuring the average intensity of the succession of scintillations emitted in response to the radiation; and determining that the sample is separated into two or more phases if, according to a predetermined comparison criterion, the average intensity of the scintillations is sufficiently less than the measured parameter.

* * * * *